United States Patent
Maruyama et al.

(10) Patent No.: US 12,409,948 B2
(45) Date of Patent: Sep. 9, 2025

(54) LIGHTNING INDUCTION SYSTEM AND METHOD THEREFOR

(71) Applicant: Nippon Telegraph and Telephone Corporation, Tokyo (JP)

(72) Inventors: Masato Maruyama, Musashino (JP); Jun Kato, Musashino (JP); Toshihisa Masuda, Musashino (JP); Naomichi Nakamura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 129 days.

(21) Appl. No.: 18/279,417

(22) PCT Filed: Mar. 3, 2021

(86) PCT No.: PCT/JP2021/008121
§ 371 (c)(1),
(2) Date: Aug. 30, 2023

(87) PCT Pub. No.: WO2022/185441
PCT Pub. Date: Sep. 9, 2022

(65) Prior Publication Data
US 2024/0182168 A1    Jun. 6, 2024

(51) Int. Cl.
*B64D 45/02*      (2006.01)
*B64U 101/00*    (2023.01)

(52) U.S. Cl.
CPC .......... *B64D 45/02* (2013.01); *B64U 2101/00* (2023.01)

(58) Field of Classification Search
CPC .............................. B64D 45/02; B64U 2101/00
See application file for complete search history.

(56) References Cited

U.S. PATENT DOCUMENTS

2010/0212925 A1* 8/2010 Canham ................. H02G 13/00
174/2
2017/0283053 A1* 10/2017 Toda ...................... H04W 84/00

FOREIGN PATENT DOCUMENTS

| CN | 107539466 | | 1/2018 |
| DE | 102022002219 | A1 * | 2/2023 |
| KR | 20170033625 | | 3/2017 |

(Continued)

OTHER PUBLICATIONS

Monoist.co.jp [online], "A system that prevents lightning strike damage with drones," Nov. 2020, retrieved on Aug. 29, 2023, retreived from URL<https://monoist.atmarkit.co.jp/mn/articles/2011/20/news052.html>, 7 pages (with English translation).

(Continued)

*Primary Examiner* — Tye William Abell
(74) *Attorney, Agent, or Firm* — Fish & Richardson P.C.

(57) ABSTRACT

A lightning induction system includes a plurality of flight vehicles 3 that fly between a lightning originating point 1 in the sky where lightning is generated and a ground surface 2. The flight vehicles 3 each include: a flight unit 10 that generates lift force and propulsion force; a conductor cable 20 that is engaged with the flight unit 10, extends downward, and has a predetermined length; and a weight unit 30 connected to the lower end of the conductor cable 20. The flight unit 10 is disposed in a Faraday cage 11. The Faraday cage 11 has a sphere shape, and the flight unit 10 is fixed by a support pillar 12 extending downward from the inner side of the top of the sphere.

6 Claims, 5 Drawing Sheets

(56) References Cited

FOREIGN PATENT DOCUMENTS

KR  20170033625 A * 3/2017
WO  WO 2015/049798   4/2015

OTHER PUBLICATIONS

[No Author Listed], "Lightning control and charging technology," NTT R&D Forum 2020 Connect, online, Nov. 17-20, 2020, 2 pages (with English translation).

* cited by examiner

Fig. 5

LIGHTNING INDUCTION SYSTEM AND METHOD THEREFOR

CROSS-REFERENCE TO RELATED APPLICATIONS

This application is a National Stage application under 35 U.S.C. § 371 of International Application No. PCT/JP2021/008121, having an International Filing Date of Mar. 3, 2021. The disclosure of the prior application is considered part of the disclosure of this application, and is incorporated by reference in its entirety into this application.

TECHNICAL FIELD

The present invention relates to a lightning induction system and a method therefor.

BACKGROUND ART

Lightning strikes anywhere, depending on the position of the cumulonimbus cloud that is the source of lightning. For example, accidents are inevitable when lightning strikes substations of a transportation system and disrupts train operations. Also, human damage still occurs several times a year, and death accidents are reported.

Studies have been made to prevent such damage to be caused by a lightning strike. For example, Non Patent Literature 1 discloses a technology for flying a drone having a conductor cable engaged between the lightning originating point in the sky where the lightning is generated and the ground surface, and thus inducing the lightning to a desired position (lightning induction).

CITATION LIST

Non Patent Literature

Non Patent Literature 1: [retrieved on Feb. 12, 2021], Internet <URL: https://monoist.atmarkit.co.jp/mn/articles/2011/20/new s052.html>

SUMMARY OF INVENTION

Technical Problem

With the technology disclosed in Non Patent Literature 1, however, it is necessary to fly the drone high to capture lightning in a wide area. Flying the drone high leads to an increase in the length of the conductor cable between the drone and the lightning strike target where lightning is struck.

If the conductor cable is made longer, the load on the drone increases due to the weight of the conductor cable and the wind pressure, and the risk of accidents due to contact between the conductor cable and a ground object other than the lightning strike target becomes higher.

The present invention has been made in view of the above problems, and aims to provide a lightning induction system and a method therefor that can shorten the length of conductor cables, reduce the load on drones, and lower the risk of accidents.

Solution to Problem

A lightning induction system according to one mode of the present invention is a lightning induction system that includes a plurality of flight vehicles that fly between a lightning originating point in the sky where lightning is generated and a ground surface. In the lightning induction system, the flight vehicles each include: a flight unit that generates lift force and propulsion force; a conductor cable that is engaged with the flight unit, extends downward, and has a predetermined length; and a weight unit connected to a lower end of the conductor cable.

Also, a lightning induction method according to one mode of the present invention is a lightning induction method for inducing energy of lightning striking a ground surface from a lightning originating point in the sky where lightning is generated, to the ground surface via a plurality of flight vehicles. The flight vehicles each include: a flight unit that generates lift force and propulsion force; a conductor cable that is engaged with the flight unit, extends downward, and has a predetermined length; and a weight unit connected to a lower end of the conductor cable.

Advantageous Effects of Invention

According to the present invention, it is possible to provide a lightning induction system and a method therefor that can shorten the length of conductor cables, reduce the load on flight units, and thus lower the risk of accidents.

DESCRIPTION OF EMBODIMENTS

In the following, an embodiment of the present invention will be described with reference to the drawings. Throughout the drawings, the same components are denoted by the same reference numerals, and the description thereof will not be repeated.

Figure 1:
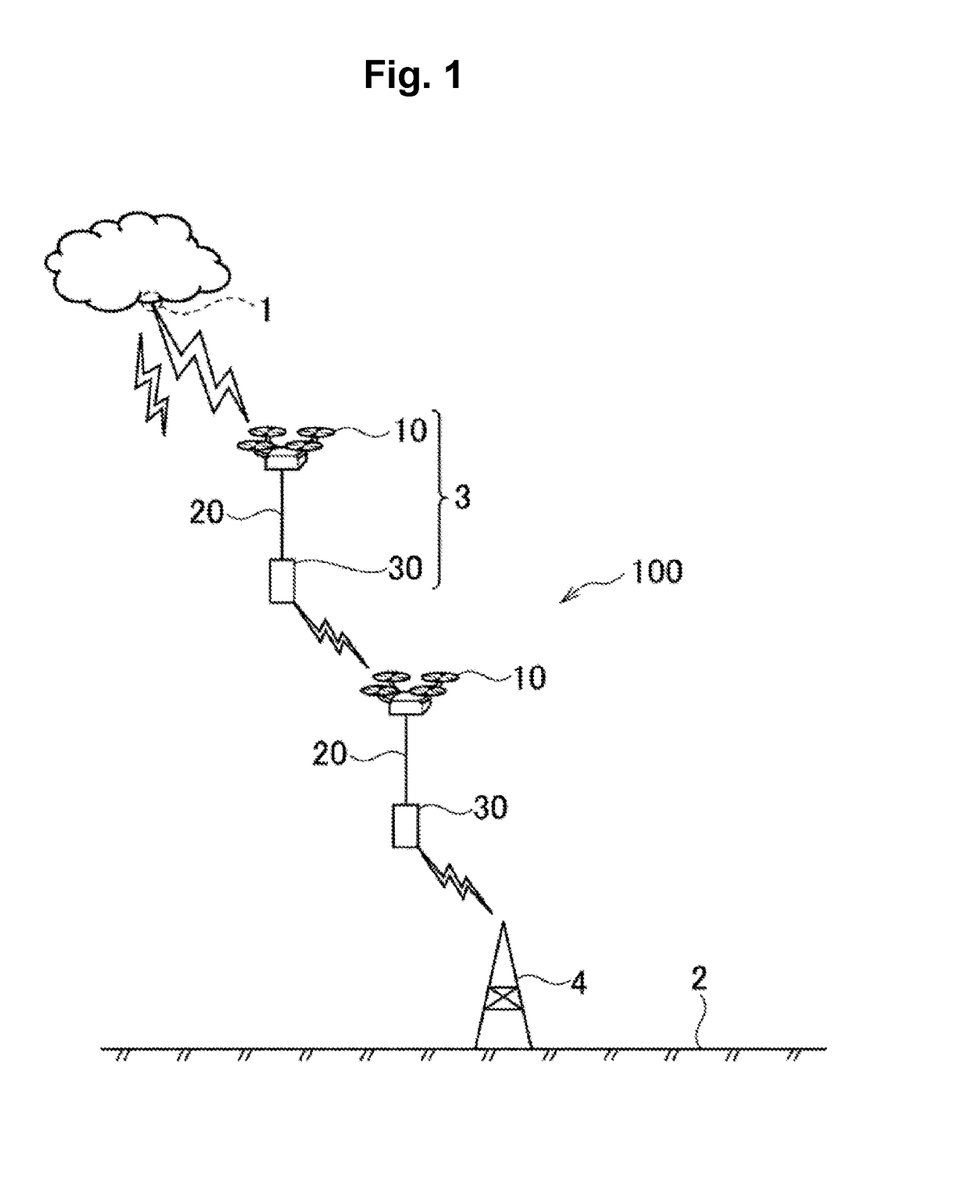
FIG. 1 is a diagram schematically illustrating an example in which a lightning induction system according to an embodiment of the present invention induces lightning.

FIG. 1 is a diagram schematically illustrating an example in which a lightning induction system according to an embodiment of the present invention induces lightning. A lightning induction system 100 illustrated in FIG. 1 includes a plurality of flight vehicles 3. FIG. 1 illustrates an example in which two flight vehicles 3 are flown between a lightning originating point 1 in a thundercloud and a ground surface 2, and lightning is induced to a lightning strike target that is a steel tower 4, for example.

The flight vehicle 3 includes a flight unit 10, a conductor cable 20, and a weight unit 30.

The flight unit 10 is a wireless flight vehicle generally called a drone, and normally flies by remote control performed by a drone pilot (not illustrated) on the ground. The flight unit 10 and the remote controller (not illustrated) being operated by the drone pilot are wirelessly connected. The two flight units 10 may be remotely controlled by one drone pilot, or may be remotely controlled by different drone pilots.

Note that the flight unit 10 may not be a wireless flight vehicle. A manned flight vehicle such as a helicopter may be used. In that case, a drone pilot to perform remote control is not necessary either.

Alternatively, the flight vehicles 3 may operate on autopilot. In that case, the required number of flight vehicles 3, the length of each conductor cable 20, and the target coordinates of each flight vehicle 3, which are the information in securing the necessary lightning induction area (=the area to be protected), are calculated in advance, and each flight vehicle 3 is informed of the target coordinate, and thus each flight vehicle 3 operates on autopilot.

One end of the conductor cable 20 is engaged with the flight unit 10, and induces the energy of lightning that has struck the flight unit 10 downward. The current of lightning reaches several hundreds of thousands of ampere (A), but the generation time thereof is about $1/10,000$ of a second to about $1/1,000$ of a second.

Accordingly, even when a power cord having a cross-sectional area of 8 mm$^2$ and an allowable current of about 61 A is used as the conductor cable 20, burning does not occur. The length of the conductor cable 20 is about 100 m, for example.

The weight unit 30 is engaged with the other end of the conductor cable 20. The weight unit 30 generates tension in a vertically downward direction in the conductor cable 20, and stabilizes the positions of the flight unit 10 and the conductor cable 20.

The distances between the flight vehicles 3 are appropriately controlled, and thus a lightning induction path with a low impedance is formed between the lightning originating point 1 and the lightning strike target (the steel tower 4 in this example). Since the lightning induction path is formed with a path having the lowest impedance, a predetermined distance may be allowed between an upper weight unit 30 and a lower flight unit 10.

As described above, the lightning induction system 100 according to the present embodiment is a lightning induction system that includes a plurality of flight vehicles 3 that fly between the lightning originating point 1 in the sky where lightning is generated and the ground surface 2. The flight vehicles 3 each include: the flight unit 10 that generates lift force and propulsion force; the conductor cable 20 that is engaged with the flight unit 10, extends downward, and has a predetermined length; and the weight unit 30 connected to the lower end of the conductor cable 20. With this configuration, it is possible to provide the lightning induction system 100 that can shorten the length of the conductor cable 20, and lower the risk of accidents.

According to the lightning induction system 100, the conductor cable 20 can be shortened to reduce the load on the drone, and the risk of entanglement of the conductor cable 20 and contact with ground equipment can be lowered. Furthermore, since there is no need to connect the lightning strike target and the conductor cable 20, a facility having a great height can be easily set as the lightning strike target. Thus, lightning can be more safely induced.

(Flight Vehicle)

Figure 2:
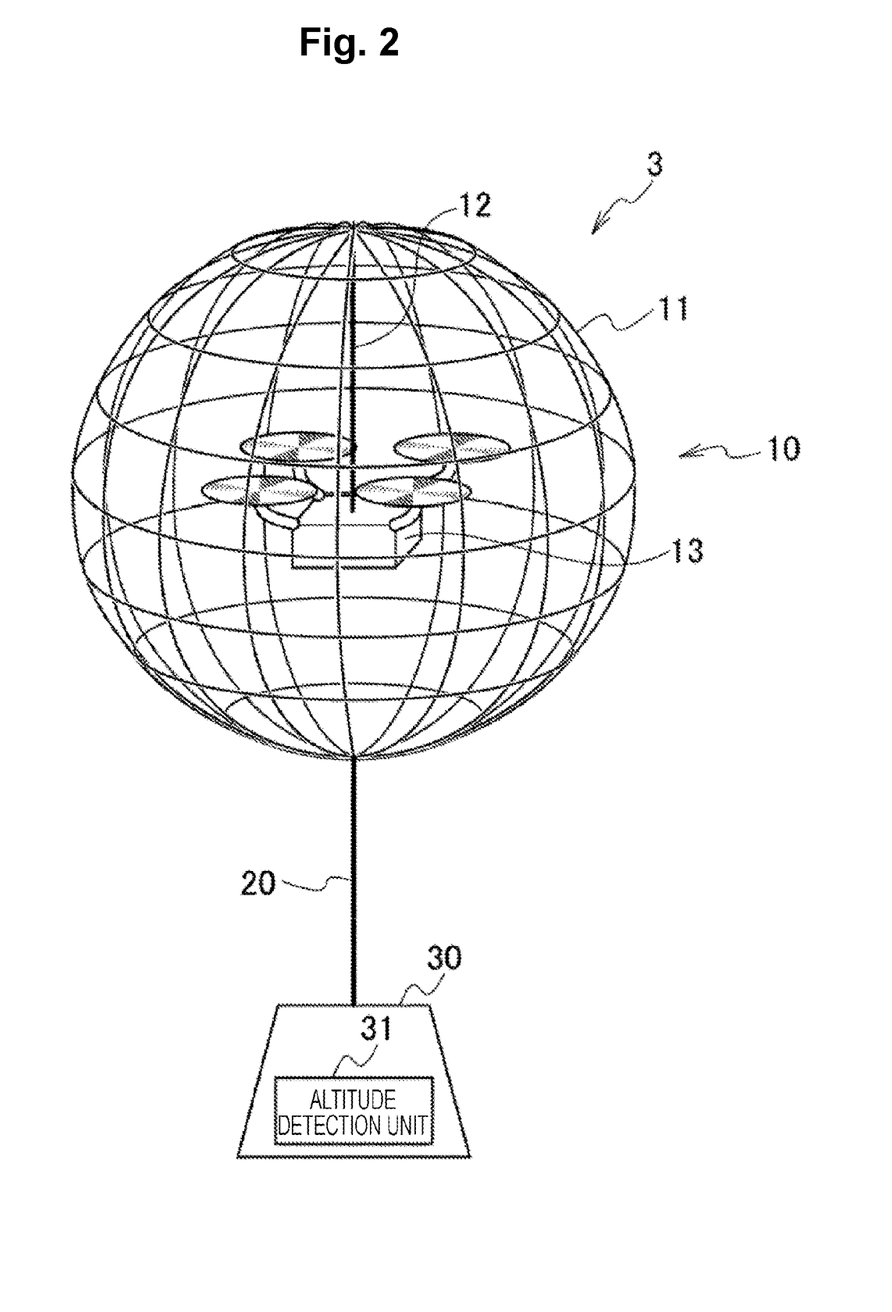
FIG. 2 is a diagram illustrating a flight unit, a conductor cable, and a weight unit that constitute a flight vehicle illustrated in FIG. 1.

FIG. 2 is a diagram illustrating the flight unit 10, the conductor cable 20, and the weight unit 30 that constitute the flight vehicle 3.

The flight unit 10 may be disposed in a Faraday cage 11. The flight unit 10 in this case is disposed in the Faraday cage 11 that is a spherical basket, for example.

The Faraday cage 11 is a space surrounded by conductors, or a conductor basket or vessel to be used to create such a space. Since any electric line of force cannot enter the inside surrounded by the conductors, external electric fields are blocked, and potentials inside are all equal.

As illustrated in FIG. 2, the flight unit 10 is fixed by one support pillar 12 extending downward from the inner side of the top of the Faraday cage 11. The flight unit 10 is fixed inside the Faraday cage 11 at a predetermined distance from the inner side so as not to disturb the flight.

With this arrangement, the flight unit 10 and the Faraday cage 11 are connected at one point. Thus, the flight unit 10 is not affected by the energy of lightning (lightning strike). Alternatively, the influence of lightning strike can be reduced.

The energy of lightning that has struck the Faraday cage 11 is discharged to the Faraday cage 11 of another flight vehicle 3 via the conductor cable 20 and the weight unit 30.

The flight unit 10 includes a flight control unit 13. The flight control unit 13 receives an operation signal from the drone pilot, and controls generation of lift force and propulsion force in the flight unit 10. The flight control unit 13 also has a function of measuring its own altitude.

The flight control unit 13 can be realized by a computer that includes a ROM, a RAM and a CPU, for example. In that case, the processing contents are written in a program.

The weight unit 30 may include an altitude detection unit 31. The altitude detection unit 31 and the flight control unit 13 may measure altitude, using either an altimeter formed with a pressure sensor or a GPS. Note that, in FIG. 2, the power supply and the like that activate the altitude detection unit 31 are not illustrated.

(Lightning Induction Method)

Figure 3:
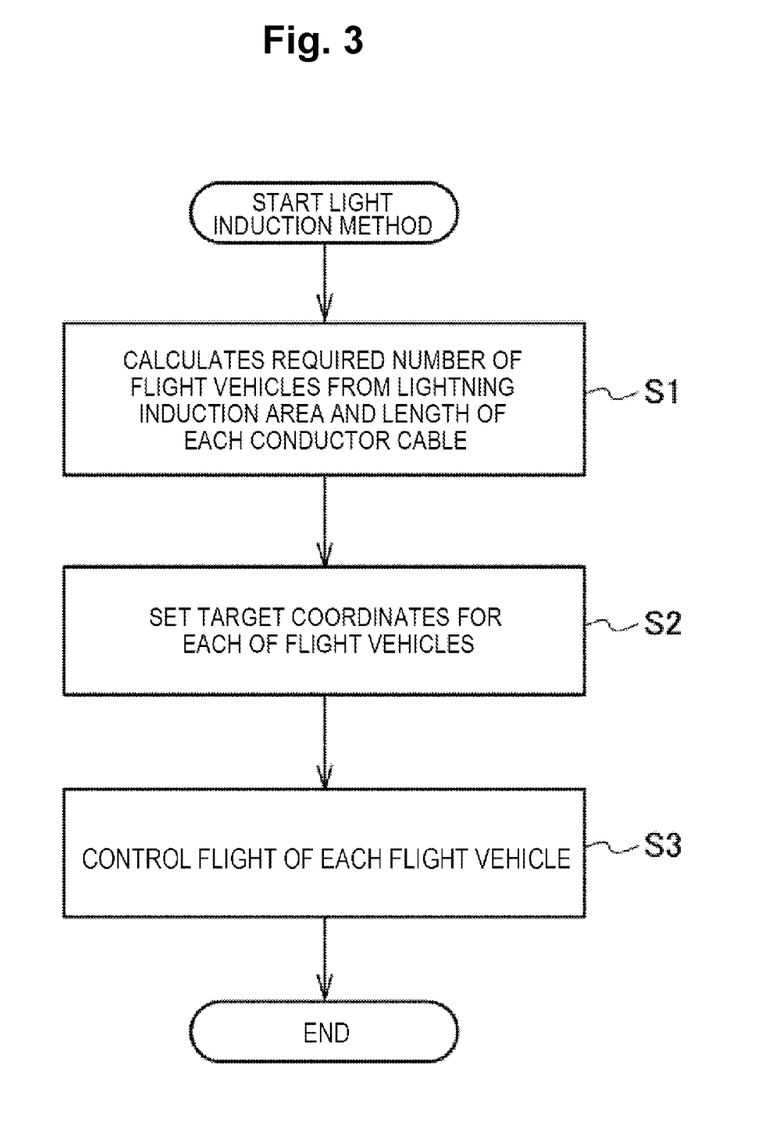
FIG. 3 is a flowchart illustrating the processing procedures of a lightning induction method according to an embodiment of the present invention.

FIG. 3 is a flowchart illustrating the processing procedures of a lightning induction method implemented with the lightning induction system 100 according to the embodiment of the present invention. The lightning induction method will be described with reference to FIG. 3.

First, the administrator using the lightning induction system 100 calculates the required number of flight vehicles 3 from the lightning induction area, and the length of the conductor cable 20 engaged with each of the flight vehicles 3, so as to secure the area (the lightning induction area) to be protected from lightning (step S1). The calculation may be performed by a control unit (not illustrated) that controls the lightning induction system 100, or may be performed by the administrator.

Next, the administrator sets target coordinates for each of the flight vehicles 3 (step S2). The target coordinates are set in three dimensions.

Next, the flight of each flight vehicle 3 is controlled (step S3). The flight control may be performed by a drone pilot, or may be automatically controlled.

Also, the altitude detection unit 31 of a first flight unit 10 that flies in the sky may cooperate with the flight control unit 13 of a second flight unit 10 that flies below the first flight unit 10. That is, the drone pilot operates only the first flight unit 10. The second flight unit 10 then flies by following, like a duck family (marching), the weight unit 30 engaged with the first flight unit 10.

Figure 4:
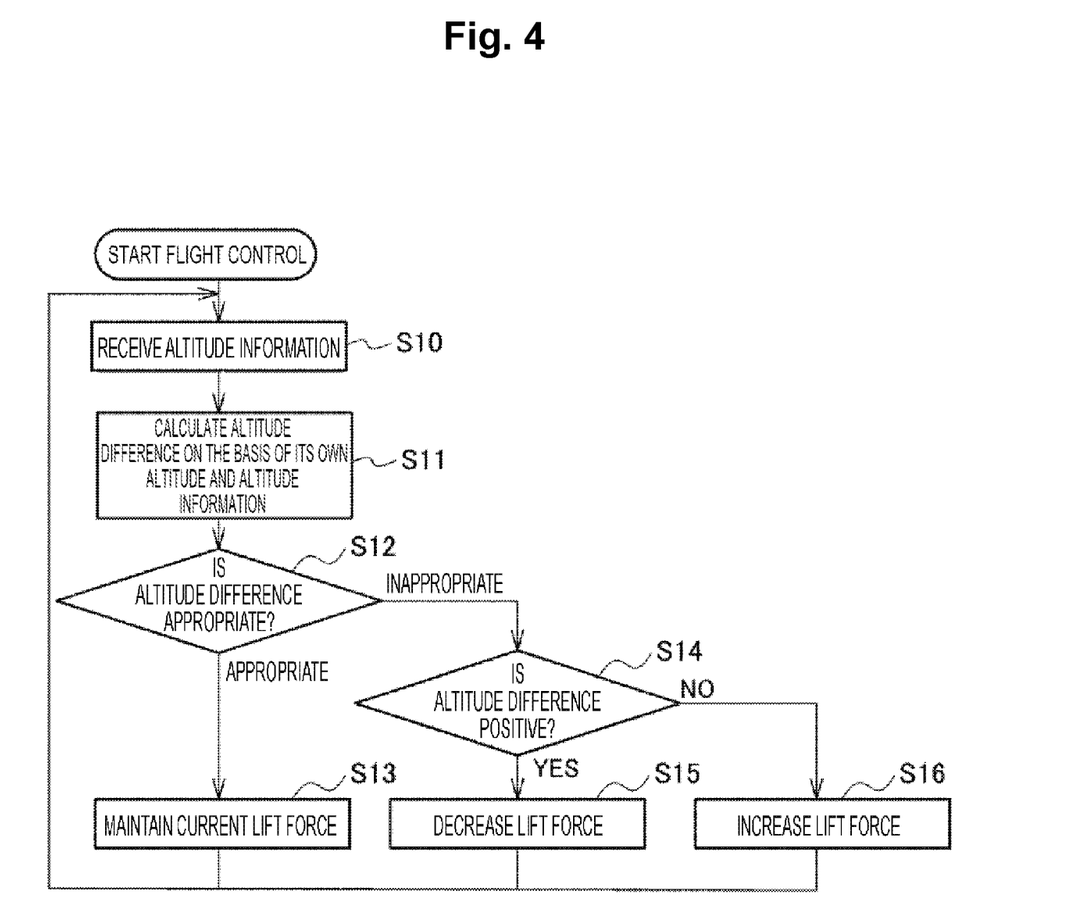
FIG. 4 is a flowchart illustrating some of the processing procedures to be carried out by a flight control unit illustrated in FIG. 2.

FIG. 4 is a flowchart illustrating some of the processing procedures to be carried out by the flight control unit 13. Referring to FIG. 4, an example of flight control to be performed in a case where a plurality of flight vehicles 3 is flown will be described.

The second flight unit 10 is flying below the first flight unit 10 in this example. The flight control unit 13 (hereinafter, referred to as the flight control unit $13_2$) of the second flight unit 10 receives altitude information detected by the altitude detection unit 31 (hereinafter, referred to as the altitude detection unit $31_1$) of the weight unit 30 engaged with the first flight unit 10 (hereinafter, referred to as the flight unit $10_1$) (step S10). The subscript "$_1$" represents each functional component of the first flight unit $10_1$, and the subscript "$_2$" represents each functional component of the second flight unit $10_2$.

The flight control unit $13_2$ calculates the altitude difference from the weight unit $30_1$ on the basis of its own altitude information and the altitude information received from the weight unit $30_1$ of the first flight unit $10_1$ (step S11).

Next, the flight control unit $13_2$ determines whether the altitude difference is appropriate (step S12). An appropriate altitude difference is an altitude difference within 10 m, for example.

If the altitude difference is determined to be appropriate ("appropriate" in step S12), the flight control unit $13_2$ maintains the current lift force (step S13).

If the altitude difference is determined to be inappropriate ("inappropriate" in step S12), the flight control unit $13_2$ then determines whether the altitude difference is positive (step S14). An altitude difference being positive means that the second flight unit $10_2$ is close to the weight unit $30_1$.

If the altitude difference is positive (YES in step S14), the flight control unit $13_2$ decreases the lift force (step S15). If the altitude difference is negative (NO in step S14), the flight control unit $13_2$ increases the lift force (step S16).

The above processing in steps S10 to S16 is repeated, and thus the weight unit $30_1$ in the sky and the flight unit $10_2$ flying below the weight unit $30_1$ maintain an appropriate altitude difference while flying.

As described above, the lightning induction system 100 may be configured such that the weight unit $30_1$ engaged with the first flight unit $10_1$ includes the altitude detection unit $31_1$ that measures the altitude and transmits the measured altitude information to the other flight unit $10_2$, and the second flight unit $10_2$ includes the flight control unit $13_2$ that receives the altitude information and controls the lift force so as to maintain a predetermined altitude difference from the weight unit $30_1$. Thus, the lightning induction system 100 can be easily operated.

MODIFIED EXAMPLE

Note that a modified example in which the weight unit 30 is formed with the flight unit 10 is also possible. According to a lightning induction system 100 of this modified example, lightning can be induced in a horizontal direction.

Figure 5:
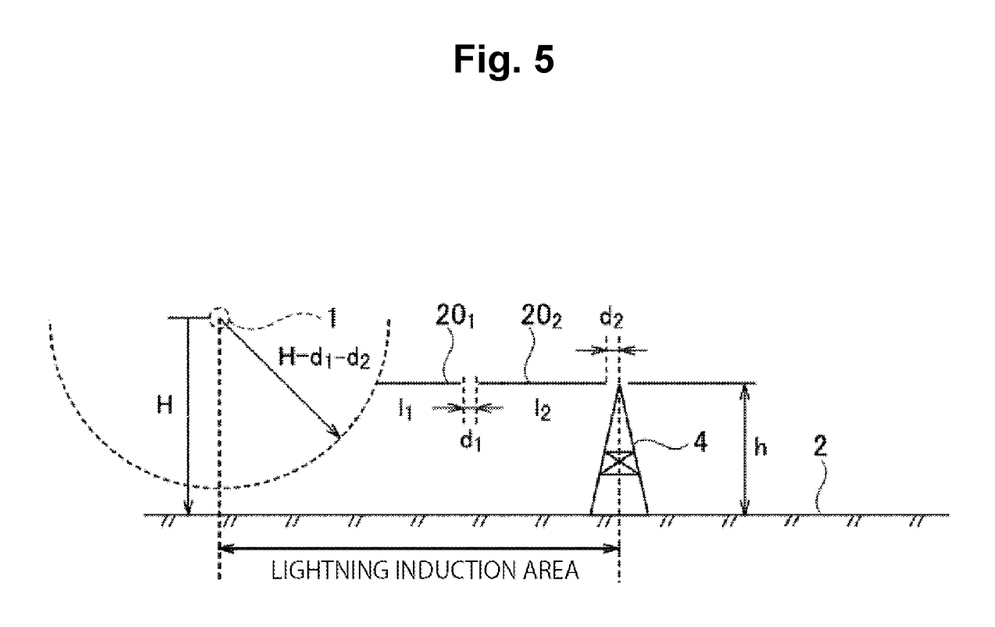
FIG. 5 is a schematic diagram illustrating an example layout of conductor cables of a lightning induction system according to a modified example.

FIG. 5 is a schematic diagram illustrating a situation in which the lightning induction system 100 of the modified example is inducing lightning in a horizontal direction. In the lightning induction system 100 of the modified example, both ends of conductor cables 20 are connected to flight units 10. In FIG. 5, the flight units 10 are not illustrated.

According to the lightning induction system 100 of the modified example, conductor cables $20_1$ and $20_2$ can be arranged in a horizontal direction at predetermined intervals $d_1$ and $d_2$, as illustrated in FIG. 5. According to the modified example, it is possible to induce lightning from a lightning originating point 1 that is located farther than the original lightning induction area of the steel tower 4.

That is, the horizontal distance from the lightning originating point 1 to the steel tower 4 (lightning strike target) can be extended as shown in the following expression.

[Mathematical Expression 1]

$$\text{Horizontal length of lightning induction area} < \sqrt{(H-d_1-d_2)^2-(H-h)^2} + l_1 + l_2 + d_1 + d_2 \quad (1)$$

Here, $l_1$ represents the length of the conductor cable $20_1$, and $l_2$ represents the length of the conductor cable $20_2$.

As described above, according to the lightning induction system 100, one or more flight vehicles 3 including the conductor cables 20 for relay fly between the flight vehicle $3_1$ for capturing lightning which includes the conductor cable $20_1$ and the lightning strike target (the steel tower 4, for example) so as to form a low-impedance path via the respective conductor cables 20. Accordingly, the conducting wire lengths of the conductor cables 20 can be shortened, and thus the load due to the lengths of the conductor cables 20 and the risk of contact with a ground object other than the lightning strike target can be reduced.

In the example described in the above embodiment, the number of flight vehicles 3 is two, but the present invention is not limited to this example. The number of flight vehicles 3 may be n (n being a natural number). Further, the shape of the Faraday cage 11 is not necessarily a sphere. Moreover, the Faraday cage 11 is not essential.

As described above, the present invention of course includes various embodiments and the like not described herein. Therefore, the technical scope of the present invention is defined only by matters to specify the invention according to the scope of claims pertinent based on the foregoing description.

REFERENCE SIGNS LIST 1 lightning originating point
2 ground surface
3 flight vehicle
4 lightning strike target (steel tower)
10 flight unit
11 Faraday cage
12 support pillar
13 flight control unit
20 conductor cable
30 weight unit
31 altitude detection unit
100 lightning induction system

The invention claimed is:

1. A lightning induction system comprising a plurality of flight vehicles that fly between a lightning originating point in the sky where lightning is generated and a ground surface, wherein the flight vehicles each include:
   a flight unit that generates lift force and propulsion force;
   a conductor cable that is engaged with the flight unit, extends downward, and has a predetermined length; and
   a weight unit connected to a lower end of the conductor cable, wherein a conductor cable of an upper flight vehicle is configured to induce an energy of the lightning that has struck a flight unit of the upper flight vehicle to a lower flight vehicle through the weight unit.

2. The lightning induction system according to claim 1, wherein
the weight unit engaged with a first flight unit of flight units includes an altitude detection unit that measures an altitude and transmits the measured altitude to a second flight unit, and
wherein the second flight unit includes a flight control unit that receives the measured altitude and controls the lift force so as to maintain a predetermined altitude difference from the weight unit of the first flight unit,
wherein the first flight unit and the second flight unit form a relay of lightning induction path to the ground.

3. The lightning induction system of claim 1, further comprising:
a first conductor cable that is engaged with a first flight unit of flight units, extending in a horizontal direction; and
a second conductor cable that is engaged with a second flight unit of the flight units, extending in a horizontal direction,
wherein the first conductor cable and the second conductor cable are oriented in a substantially horizontal direction between the first flight unit and the second flight unit, wherein the first flight unit and the second flight unit form a horizontal relay of lightning induction path.

4. The lightning induction system according to claim 1, wherein the flight unit is disposed in a Faraday cage.

5. The lightning induction system according to claim 4, wherein
the Faraday cage has a sphere shape, and
the flight unit is fixed by a support pillar extending downward from an inner side of a top of the Faraday cage.

6. A lightning induction method for inducing energy of lightning striking a ground surface from a lightning originating point in the sky where lightning is generated, to the ground surface via a plurality of flight vehicles,
wherein the flight vehicles each include:
a flight unit that generates lift force and propulsion force;
a conductor cable that is engaged with the flight unit, extends downward, and has a predetermined length; and
a weight unit connected to a lower end of the conductor cable, wherein a conductor cable of an upper flight vehicle is configured to induce an energy of the lightning that has struck a flight unit of the upper flight vehicle to a lower flight vehicle through the weight unit.

* * * * *